Dec. 16, 1924.

O. N. NELSON ET AL

PLOW ATTACHMENT

Filed April 7, 1924

1,519,161

Inventors
Olaus N. Nelson,
Wilhelm E. Strandquist.
By Bair & Freeman, Attys

Patented Dec. 16, 1924.

1,519,161

UNITED STATES PATENT OFFICE.

OLAUS N. NELSON AND WILHELM E. STRANDQUIST, OF SIOUX CITY, IOWA.

PLOW ATTACHMENT.

Application filed April 7, 1924. Serial No. 704,747.

*To all whom it may concern:*

Be it known that we, OLAUS N. NELSON and WILHELM E. STRANDQUIST, citizens of the United States, and residents of Sioux City, in the county of Woodbury and State of Iowa, have invented certain new and useful Improvements in Plow Attachments, of which the following is a specification.

Our invention relates to plow attachments and has for its object to provide a disintegrating device of novel, durable and inexpensive construction for removing and preventing accumulation of weeds and trash between the beams of a multiple bottom plow.

It is our object to provide a device which will keep the rear bottoms clean so as to eliminate the necessity of attention from the operator. This is of special value where the operator uses a tractor for pulling the plow, and thus is positioned in advance of the plow where he can not readily observe it.

A further object is to provide a device adapted to ready attachment to the ordinary makes of plow.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1:
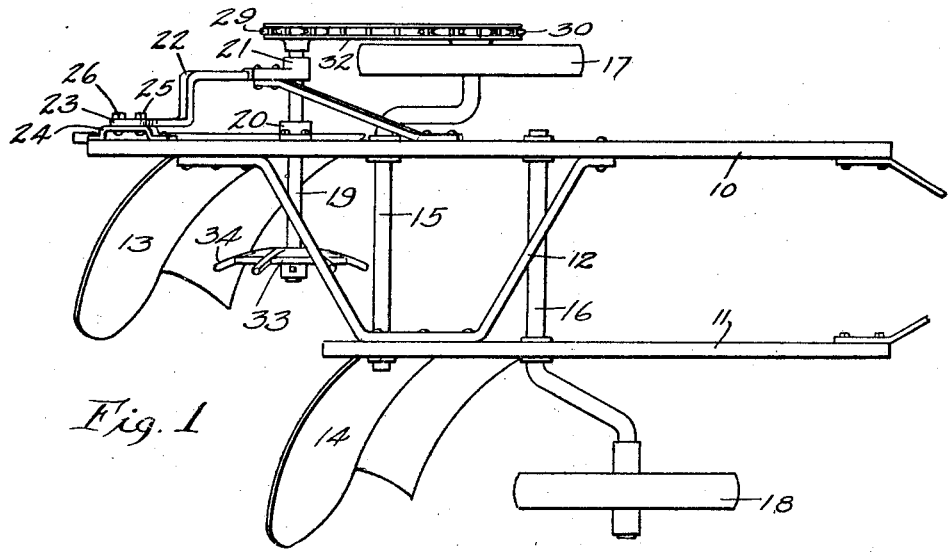
Fig. 1 is a plan view of a two bottom plow with our device attached.
Figure 2:
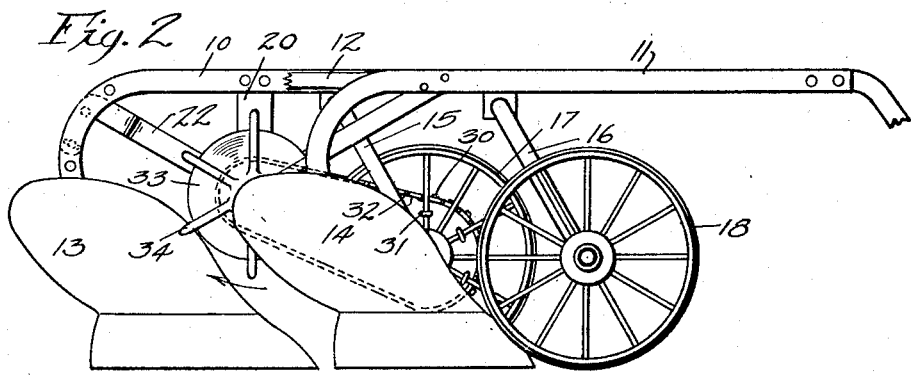
Fig. 2 is a side elevation of the same.
Figure 3:
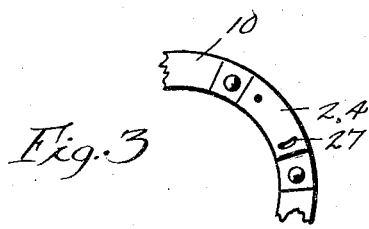
Fig. 3 is a detail view of a portion of our attachment.

We have used the reference characters 10 and 11 to indicate generally the beams of a two bottom tractor plow, which are connected by the brace, 12.

On the beams, 10 and 11, respectively are the bottoms, 13 and 14. The axles, 15 and 16 support the wheels, 17 and 18, respectively, of the plow, the means for raising and lowering the same not being shown.

Our attachment comprises the disintegrating shaft, 19, supported in brackets, 20 and 21, the latter being fixed to a brace, 22, having the short elbow, 23, pivoted to the bracket, 24, by means of the bolt, 25. A bolt, 26, extended through the slot, 27, in the bracket, 24, allows pivotal movement of the brace, 22, around the bolt, 25, and serves to lock the brace in any position of adjustment. It will be understood that the slot, 27, allows adjustment of the brace, 22, while the attachment is being installed, in order to adapt it to variations in size of different makes of plows. The bracket, 20, may be attached to the beam, 10, by drilling the beam and bolting the bracket thereto in the suitable position.

A brace, 28, may be employed to steady the outer end of the brace, 22, and is attached in the same manner as the bracket, 20. On the outer end of the shaft, 19, is a sprocket, 29. A sprocket, 30, is attached by means of U bolts, 31, to the wheel, 17, and is aligned with the sprocket, 29.

A chain, 32, connects the two sprockets, 29 and 30. It will be noted that rotation of the wheel, 17, will impart rotation to the disintegrator shaft in the same direction.

On the inner end of the shaft is the disintegrating disk, 33, having the projecting fingers, 34.

It will be noted that the disk, 33, is positioned substantially midway between the beams, 10 and 11, and above and forwardly of the rear bottom, 13. It rotates as shown by the arrow, 35.

One of the difficulties always experienced with a multiple beam plow has been the tendency of the weeds, corn-stalks and other trash in the ground being plowed to become clogged between the two beams and the rear bottom. When riding plows were driven, pulled by horses, the driver could reach down with a foot and push away any foreign material before it became badly clogged.

However, where a tractor is used for pulling the plow, the operator is positioned considerably ahead of the plow and is not able to give attention to the tractor and the plow at the same time so as to prevent its becoming clogged. As a result the plow will often become so badly clogged that it will no longer cut through the ground, and a half hour's work may be necessary in order to remove the material.

It will be seen that our disintegrating disk is positioned so that the lower portion thereof engages the material between the beams and urges it rearwardly.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. In combination with a plow having a plurality of bottoms, wheels and beams for supporting the same, a disintegrator shaft, a disintegrating disk mounted on the shaft forwardly of and above the rear bottom, and means driven from a wheel of the plow for rotating the shaft in the direction of rotation of the wheels of the plow.

2. In combination with a plow having a plurality of bottoms, wheels and beams for supporting the same, a disintegrator shaft, a disintegrating disk mounted on the shaft forwardly of and above the rear bottom, a sprocket on a wheel of the plow, an aligned sprocket on the disintegrator shaft, a chain connecting said sprockets so as to rotate the disintegrator shaft in the direction of rotation of the wheel, and means driven from a wheel of the plow for rotating the shaft in the direction of rotation of the wheels of the plow.

Signed at Sioux City, in the county of Woodbury and State of Iowa, this 29th day of March, 1924.

OLAUS N. NELSON.
WILHELM E. STRANDQUIST.